United States Patent [19]

Vordermaier

[11] Patent Number: 5,566,593
[45] Date of Patent: Oct. 22, 1996

[54] DRIVE DEVICE FOR A VEHICLE PART THAT IS DISPLACEABLE BETWEEN END POSITIONS

[75] Inventor: Claus Vordermaier, München, Germany

[73] Assignee: Webasto Karosseriesysteme GmbH, Germany

[21] Appl. No.: 371,435

[22] Filed: Jan. 11, 1995

[30] Foreign Application Priority Data

Feb. 5, 1994 [DE] Germany ............... 44 03 574.8

[51] Int. Cl.⁶ .................. B60J 7/057; F16H 1/16
[52] U.S. Cl. .............. 74/625; 74/89.14; 192/139; 296/223
[58] Field of Search ........................ 74/625, 89.14, 74/425; 296/223; 192/138, 139, 143; 475/162

[56] References Cited

U.S. PATENT DOCUMENTS

| | | | |
|---|---|---|---|
| 3,791,071 | 2/1974 | Niklaus | 74/625 X |
| 3,874,722 | 4/1975 | Pickles | 296/223 |
| 4,191,068 | 3/1980 | Jardin et al. | 74/625 |
| 4,272,125 | 6/1981 | Bienert et al. | 296/223 |
| 4,328,885 | 5/1982 | Zouzoulas | 192/139 X |
| 4,468,063 | 8/1984 | Yukimoto et al. | 296/223 |
| 4,531,777 | 7/1985 | Bienert et al. | 296/223 |
| 4,651,594 | 3/1987 | Vogel et al. | 296/223 X |
| 4,659,141 | 4/1987 | Masuda et al. | 296/223 |
| 4,841,812 | 6/1989 | Fuerst et al. | 296/223 |
| 4,893,870 | 1/1990 | Morlya et al. | 296/223 |
| 4,996,395 | 2/1991 | Tada | 475/162 X |
| 5,003,836 | 4/1991 | Mitsugu et al. | 74/425 |
| 5,101,684 | 4/1992 | Mosslacher | 74/625 |
| 5,181,891 | 1/1993 | Pohl et al. | 475/162 |

FOREIGN PATENT DOCUMENTS

| | | | |
|---|---|---|---|
| 0410487 | 1/1991 | European Pat. Off. | 296/223 |
| 2364429 | 7/1975 | Germany | 296/223 |
| 3823869 | 1/1990 | Germany | 296/223 |

Primary Examiner—Charles A. Marmor
Assistant Examiner—Troy Grabow
Attorney, Agent, or Firm—Sixbey, Friedman, Leedom & Ferguson, P.C.; David S. Safran

[57] ABSTRACT

A drive device for a vehicle part that can be displaced between end positions, especially for a cover of an openable vehicle roof. The drive device is actuated by an electric motor that is connected, by a reduction gear, to a pinion gear placed on an output shaft. The drive device further has a switch element controlling the electric motor, to stop it in at least one predetermined position and an eccentric gear arrangement is provided to actuate the switch. The drive device enables an emergency actuation in which manual actuation of the output shaft is made possible by uncoupling of the electric motor while maintaining the coupling of the switching gear elements, so that, after an emergency actuation, no readjustment of the switching arrangement is necessary.

8 Claims, 3 Drawing Sheets

FIG. 4
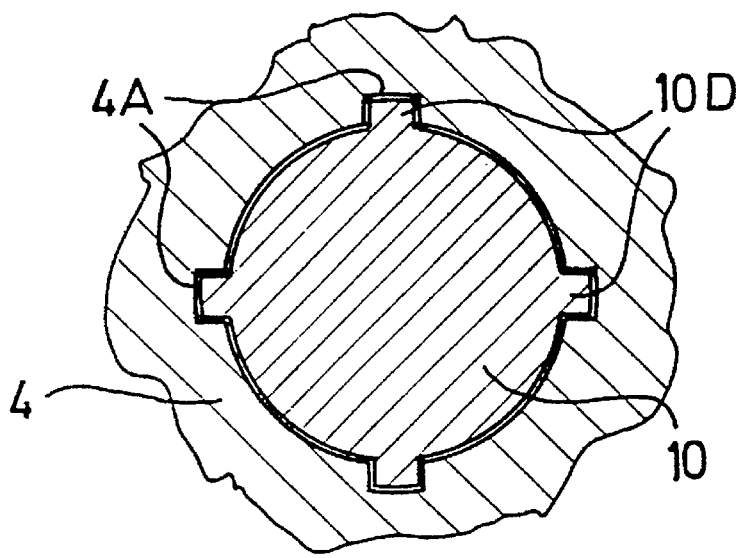
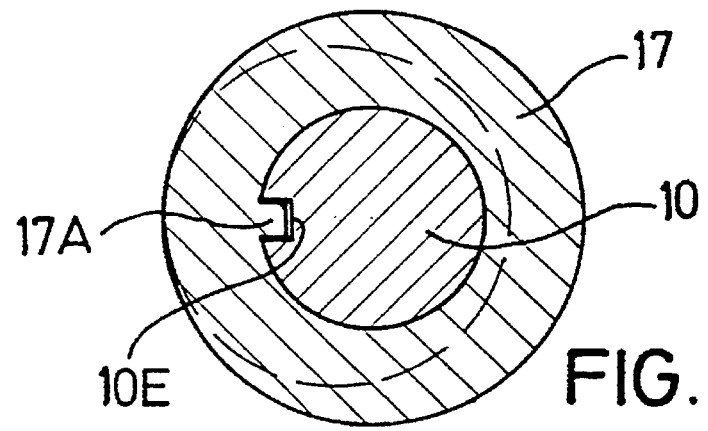
FIG. 3
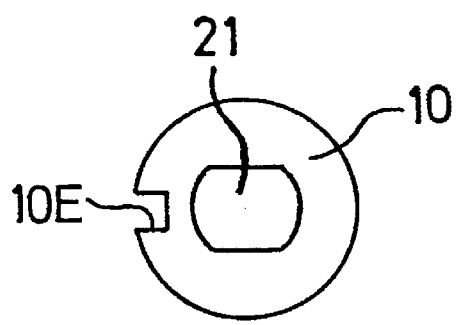
FIG. 5

5,566,593

DRIVE DEVICE FOR A VEHICLE PART THAT IS DISPLACEABLE BETWEEN END POSITIONS

BACKGROUND OF THE INVENTION

1. Field of the Invention

The invention relates to a drive device for a vehicle part that is displaceable between end positions, in particular for a cover of an openable vehicle roof with an electric motor that is connected by a reduction gear to a pinion gear on an output shaft, the pinion gear having a driving connection to the adjustment part by power transmission means, and with at least one switch controlling the electric motor to stop the electric motor in at least one predetermined position of the adjustable part. Furthermore, to actuate the switch, a switch wheel of an eccentric wheel gear is provided that has a driving connection, by an input shaft, to the reduction gear.

2. Description of Related Art

A generic drive device is known from U.S. Pat. No. 5,181,891 in which a switch element for the driving electric motor is actuated by an eccentric wheel gear, offering a relatively simple design and high actuated by an eccentric wheel gear, offering a relatively simple design and high switching precision, especially for the end positions of the part to be adjusted. The drawback of the arrangement disclosed in this patent is that, with a possible failure of the electric motor, no emergency actuation device is provided for manually closing the displaceable part.

An emergency actuation device with which an electric drive motor can be uncoupled for manual emergency actuation by axially shifting an input shaft is known from published European Patent Application 0 410 487 A2. However, the drive shown there has no gear parts placed coaxial to the input shaft to trigger the switching operations.

In another drive device used by the assignee of the applicant, it is true that such an eccentric wheel gear, coaxial to the input shaft, is present, but, with an axial shifting of the input shaft during an emergency actuation operation, the eccentric wheel gear, like the worm wheel coupled with the electric motor, is brought out of mesh. This results in the drawback that, after an emergency actuation, the gearwheels provided for normal drive and the gearwheels provided for the switching actuations have lost their original reference positions that were matched exactly to each other. Thus, after an emergency actuation that is attributable to problems in the voltage supply of the vehicle and not a defective drive, nonetheless, a costly stay in the repair shop for a readjustment of the overall drive is necessary.

In the case of U.S. Pat. No. 4,841,812, a drive device for the cover of sliding and lifting roofs uses a planetary gear assembly which automatically produces a different gearing ratio when operated in one direction than in another direction by a drive motor. The drive shaft has an axial extension which has a hexagonal socket within which an appropriate tool can be engaged for operation of the drive in the event of a malfunction of the electric motor or an inadequate current supply. However, no means for disconnecting the drive from the motor is described so that considerable effort would required to overcome the resistance of an inoperative motor.

SUMMARY OF THE INVENTION

In view of the foregoing, the primary object of this invention is to develop a drive device of the above-mentioned type which will require no readjustment with respect to end position switching after an emergency actuation.

This object is achieved by the features according to the invention whereby the input shaft exhibits, with respect to a worm wheel driven by the electric motor and with respect to the eccentric wheel gear provided to actuate the switch, geared means that can be axially shifted for an emergency actuation of the pinion gear, and simultaneously the eccentric wheel gear, unchanged, remains meshed with the input shaft. This is achieved in a simple way in that the geared means, viewed axially between the input shaft and the worm wheel, have a shorter length than the geared means that produce a connection between the input shaft and the eccentric wheel gear. Thus, the gear elements of the eccentric wheel gear provided for the actuation of the switches remain independent of the type of drive, i.e., regardless of whether the electric motor or, with an axial shifting of the input shaft, a manual tool, actuates the pinion gear, which remains meshed with the input shaft. The switch elements, thus, are not adjusted relative to the end positions of the part to be driven.

In an advantageous embodiment it is provided that the input shaft, independent of its axial position, is meshed by geared means with the output shaft driving the pinion gear. This is possible in a simple and space-saving way by a meshing external or internal toothing, for example, in the form of an axially running serration.

A drive device that is reliable and yet easy to handle in an emergency situation results from the fact that the input shaft is prestressed by a spring toward its meshing position with the worm wheel. In this way, the meshing position of the input shaft with the worm wheel, which represents the starting state, is maintained with certainty, regardless of the fitting position of the drive device. On the other hand, light pressure against the prestressing spring makes it possible to actuate the input shaft simply in an emergency.

To accommodate the spring in a space-saving and secure way, it is advantageous if the input shaft and the output shaft each have, on their faces that face each other, a hollow space that surrounds the spring at least on its ends.

For a compact design of the drive device and a good support of the input shaft, it is advantageous if the input shaft, in its center part, has a collar that is widened in diameter and on whose outer periphery the geared means are placed for coupling with means on the worm wheel that are shaped to complement those on the collar.

An arrangement of the drive device that is compact and easy to install results from the fact that the output shaft is supported in a sleeve-like input shaft bearing that is placed permanently in a housing part of the drive device and that has, on its underside facing the input shaft, a widened receiving space to receive the collar during an axial shift of the input shaft.

Finally, it is advantageous for simple operation in an emergency if the input shaft, on its face that faces away from the output shaft, has means for a geared engagement of an emergency tool.

These and further objects, features and advantages of the present invention will become apparent from the following description when taken in connection with the accompanying drawings which, for purposes of illustration only, show a single embodiment in accordance with the present invention.

BRIEF DESCRIPTION OF THE DRAWINGS

FIG. 3 is a cross section through the bottom part of the input shaft and the eccentric wheel taken along line III—III in FIG. 1;

FIG. 4 is a cross section through the collar of the input shaft and the surrounding worm wheel taken along line IV—IV in FIG. 1;

FIG. 5 is a bottom end view of the input shaft viewed in the direction of arrow V in FIG. 1;

DETAILED DESCRIPTION OF THE PREFERRED EMBODIMENT

Figure 1:
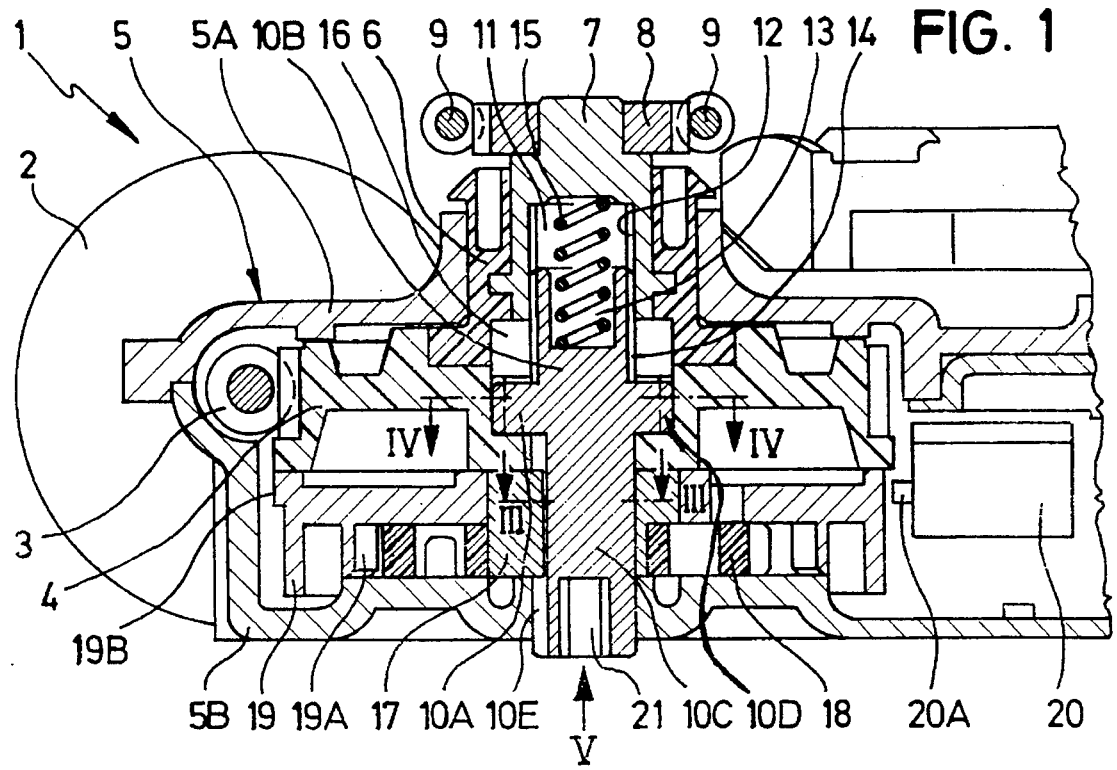
FIG. 1 shows a lengthwise section through a drive device of the invention in its normal operating position.
Figure 2:
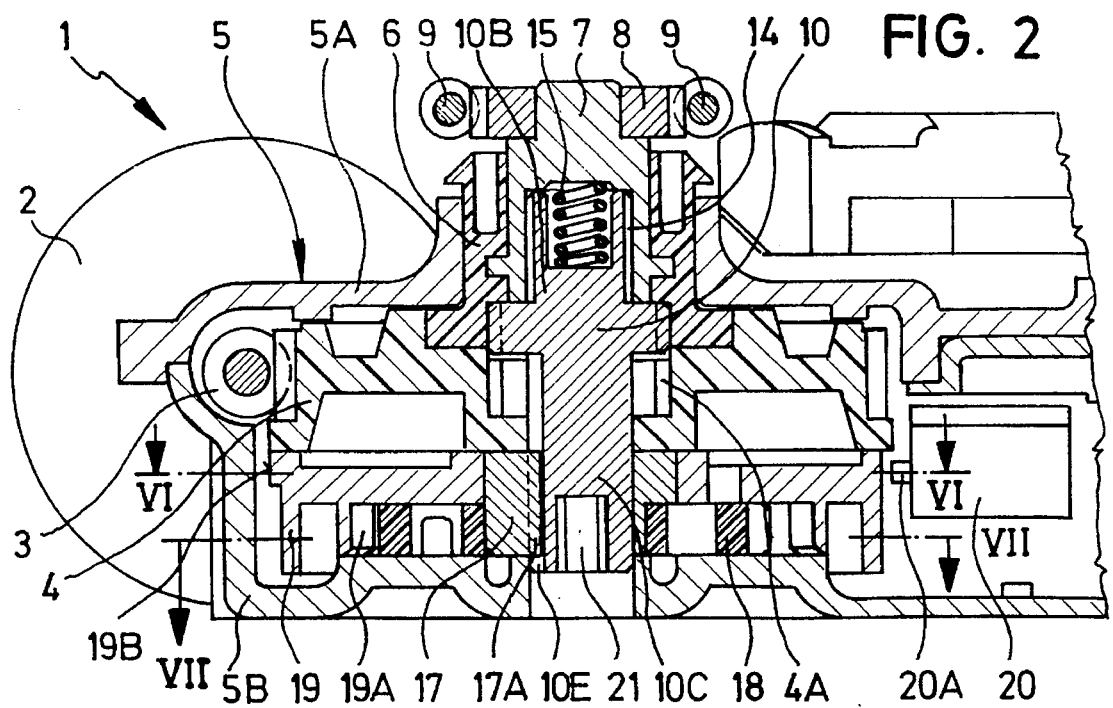
FIG. 2 shows the drive device according to FIG. 1 in its emergency actuation position.

In FIG. 1, a drive device 1 is represented, as it is used, for example, to actuate a sliding-lifting roof in a vehicle. The gear necessary for that is accommodated in a housing, designated 5 overall, and which is composed of a housing top part 5A and a housing bottom part 5B. An electric motor 2, indicated diagrammatically in FIG. 1, is ranged onto housing 5 or is formed integrally with one of the housing pans. Electric motor 2 drives a worm-gear shaft 3, which can be seen in FIGS. 1 and 2 in the left top part of the housing, and the shaft 3 engages a worm wheel 4. Housing top pan 5A and housing bottom pan 5B have coaxial cylindrical bearing bores perpendicular to the axis of the worm-gear shaft. A sleeve-like output shaft bearing 6 with a molded-on plastic bearing surface and axial clip is inserted into the bearing bore of housing top pan 5A. Output shaft bearing 6 is used to support an output shaft 7 so as to be able to rotate without being able to move axially. A pinion gear 8 is attached on the top end of output shaft 7 so to be constrained to rotate therewith.

The pinion gear 8 has an external toothing which makes a driving connection with drive cables 9 that have spiral-shaped toothing and which are coupled to the part to be displaced, i.e., in this case, the cover of the sliding-lifting roof. An input shaft 10 is supported in the bearing bore of housing bottom pan 5B, coaxial to output shaft 7. The input shaft is composed of a lower shaft portion 10C, a collar 10A with a larger diameter located in a center pan of the input shaft, and an upper shaft portion 10B adjacent to collar 10A. Upper shaft portion 10B has, on its periphery, axially running serrations 14 that mesh with an internal toothing 12 that are shaped to complement it and provided on the inner side of a hollow space 11 of output shaft 7. Serrations 14 and internal toothing 12 make possible an axial shifting of input shaft 10 with respect to axially stationary output shaft 7, without interrupting power transmission therebetween. Upper shaft 10B of input shaft 10 further has, on its end facing output shaft 7, a hollow space 13. Into this hollow space 13, and into hollow space 11 of output shaft 7, a spring 15 is disposed that presses input shaft 10 away from the output shaft 7, so that input shaft 10 is prestressed toward its normal working position represented in FIG. 1.

Collar 10A of input shaft 10, which is wider in diameter than upper shaft portion 10B, has four claws 10D distributed on its periphery. In the normal working position represented in FIG. 1, the claws 10D make a drive connection with four grooves 4A on an inner diameter of a worm wheel 4 which, with its external toothing, is meshed with worm-gear shaft 3. Claws 10D are axially movable in grooves 4A. The axial extent of grooves 4A is such, during an axial shifting of input shaft 10 from the normal working position represented in FIG. 1 to the emergency actuation position represented in FIG. 2, the claws 10D disengage from the grooves 4A. During this axial shifting, collar 10A of input shaft 10 is moved axially into a receiving space 16 provided on the underside of output shaft bearing 6.

Figure 6:
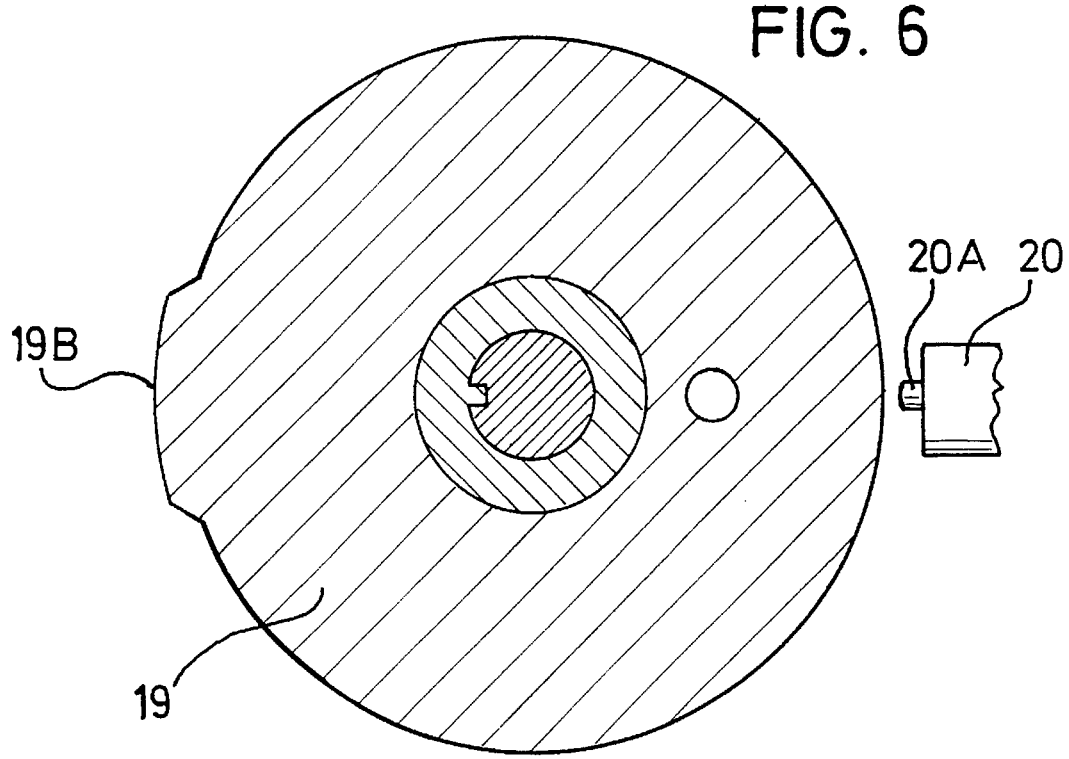
FIG. 6 is a cross-sectional view through the switch wheel indexing gear taken along line VI—VI in FIG. 2.
Figure 7:
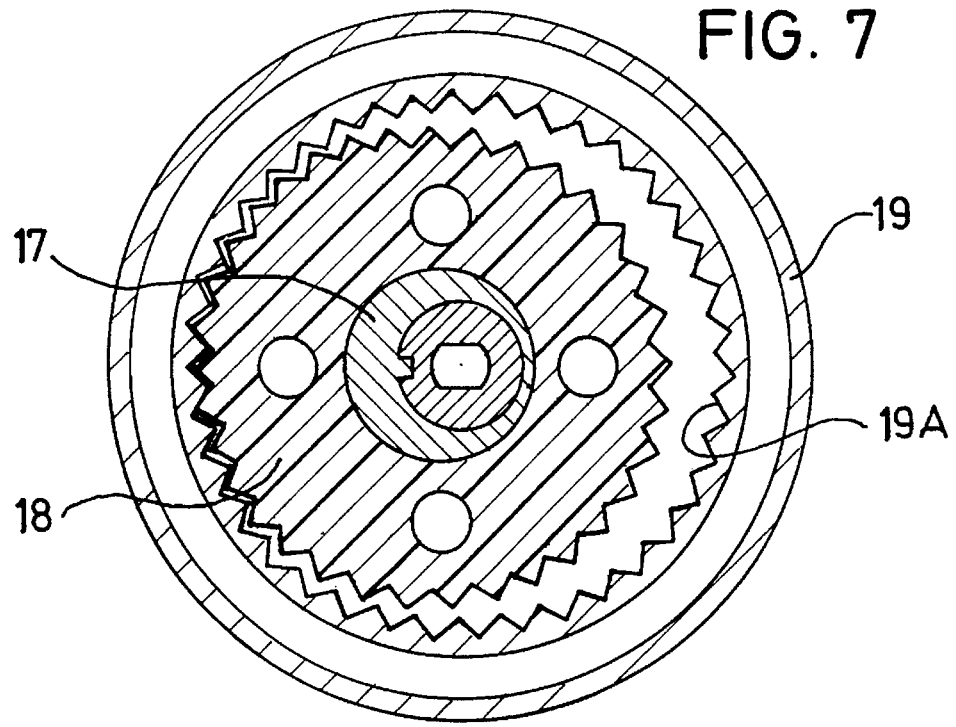
FIG. 7 is a cross-sectional view through the indexing gear and eccentric gear taken along line VII—VII in FIG. 2.

The lower shaft portion 10C, which also has a smaller diameter than collar 10A, is provided with an axial groove 10E running over the entire length of its periphery, as can be seen in FIGS. 3 and 5. An eccentric cam 17, which is meshed, by a driver 17A on its inner side, with a groove 10E of input shaft 10, is located on the lower shaft portion 10C. Driver 17A and groove 10E, in their axial direction, are of a size such that, even with a shifting of input shaft 10 from the normal working position represented in FIG. 1 to the emergency actuation position represented in FIG. 2, do not become disengaged from each other. Eccentric cam 17 is composed of a cylindrical top part and an eccentric bottom part. An eccentric wheel 18 rotates on the eccentric bottom part. A switch wheel indexing gear 19 is supported on the cylindrical top part of eccentric cam 17 as shown in FIG. 6. Indexing gear 19 is indexed by the eccentric wheel 18 via internal toothing 19A. A trip cam 19B on the periphery of gear 19 actuates a trip plunger 20A of a microswitch 20 that, preferably, in the end positions of the part to be displaced (e.g., the roof cover), interrupts the current feed to electric motor 2.

Details of the function of the eccentric wheel gear (the eccentric cam 17, eccentric wheel 18 and switch wheel indexing gear 19) can be drawn from above-mentioned U.S. Pat. No. 5,181,891, and thus, they need not be described here in detail, since it is merely their presence but not their function that is significant to this invention. For example, FIGS. 3 & 4 of that patent show a cam 37 (which corresponds to cam 19B of this application) engaging the trip plunger 35 of a microswitch 33 (which corresponds to plunger 20A of switch 20, here) in the same manner as occurs in the illustrated embodiment of this application.

Facing outwardly from the bottom end of lower shaft portion 10C of input shaft 10 is a recess 21 in which, in emergencies, a tool shaped to complement it is inserted. Recess 21, as provided, can be made as a dihedron, square or hexagonal recess. Variants with respect to the geared connection of input shaft 10 to output shaft 7, to worm wheel 4 and to eccentric cam 17, are also up to one skilled in the art. Instead of the above-described serrations 12, 14, the claw/groove connection 10D/4A and the groove-driver connection 10E/17A, all other means familiar to one skilled in the art are also usable that guarantee an axial shifting with simultaneous maintenance of a driving connection on the periphery. Only by way of example are a feather key connection, a keying, or a polygonal connection mentioned here.

Below, the function of the drive device according to the invention is described. In the normal operating state represented in FIG. 1, electric motor 2 drives, by worm-gear shaft 3, worm wheel 4. Worm wheel 4 drives, by grooves 4A and claws 10D meshing in them (FIG. 4), input shaft 10. Upper shaft 10B of input shaft 10 slaves, by its external toothing 14, internal toothing 12 of output shaft 7 and thus drives pinion gear 8. Pinion gear 8, for its part, drives drive cables 9 that are coupled to the cover to be displaced. Simultaneously, by lower shaft portion 10C, by its groove 10E and driver 17A, eccentric cam 17 is triggered to turn. Eccentric wheel 18 meshes with internal toothing 19A of indexing gear 19 once every revolution and turns the gear 19 a certain amount further. Upon reaching a predetermined final position, trip cam 19B, provided on the outer periphery of indexing gear 19, actuates trip plunger 20A of microswitch 20 which, as a result, interrupts, by a control unit not represented, the current feed to electric motor 2.

If for any reason electric motor 2 cannot be actuated and yet still the part to be actuated, in this case the cover, is to be displaced, then a tool, not represented, is inserted into recess 21 on the lower shaft portion 10C of input shaft 10. Input shaft 10 is moved axially upward against the pressure of spring 15, and claws 10D come out of their engagement with grooves 4A of worm wheel 4. On the other hand, teeth 12, 14 remain engaged between input shaft 10 and output shaft 7, just as do driver 17A and groove 10E on lower shaft portion 10C of the input shaft 10. By a rotating of input shaft 10 by the additional tool, the part to be actuated can be moved without the operator having to work against the resistance of currentless electric motor 2. Since the end positions of the part to be actuated, with respect to the switching gear arrangement, do not change with this type of actuation, actuation directly by electric motor 2, when the problem in the voltage supply is fixed, can continue, without a readjustment of the switching means being necessary.

The drive device according to the invention combines the advantages of a compact and convenient switching gear arrangement with those of a simple and effective emergency actuation device.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Drive device for a vehicle part that is displaceable between end positions, comprising an electric motor that is connected by a reduction gear to a pinion gear on an output shaft via an input shaft, the pinion gear being in driving connection with the displaceable vehicle part by power transmission means, at least one switch for stopping operation of the electric motor in at least one predetermined position of the displaceable vehicle part, and an indexing gear and eccentric gear in driving connection with the reduction gear for actuation of the switch; wherein the output shaft, a driving part of the eccentric gear and a worm wheel of the reduction gear are drivingly coupled to the input shaft in a normal working position of the drive device and have gear means enabling axial shifting of the input shaft into an emergency actuation position in which the worm wheel is uncoupled from the input shaft, and the eccentric gear and the output shaft remain coupled with the input shaft.

2. Drive device according to claim 1, wherein the input shaft is meshed with the output shaft by geared means independent of the axial position of the input shaft.

3. Drive device according to claim 1, wherein the input shaft is prestressed by a spring toward said normal working position in which the input shaft is coupled with the worm wheel.

4. Drive device according to claim 3, wherein the input shaft and the output shaft have ends which face each other, a hollow space being formed in said facing ends in which at least end portions of said spring are received.

5. Drive device according to claim 1, wherein the input shaft has a collar on a center part which has a wider diameter then the upper and lower portions of the shaft; and wherein gear means are provided on the periphery of the center part for coupling with complementarily shaped gear means on the worm wheel.

6. Drive device according to claim 5, wherein the output shaft is supported in a sleeve-shaped input shaft bearing that is permanently disposed in a housing part of the drive device; and wherein an underside of the input shaft bearing which faces the input shaft has a widened receiving space for receiving the collar of the input shaft during the axial shifting of input shaft into said emergency actuation position.

7. Drive device according to claim 1, wherein the input shaft has means for a geared engagement of an emergency actuation tool on an end face that faces away from the output shaft.

8. Drive device according to claim 1, wherein said transmission means comprises drive cables for displacement of a movable cover of an openable vehicle roof.

\* \* \* \* \*